United States Patent [19]

Schulte

[11] 4,343,614
[45] Aug. 10, 1982

[54] DRIVE SPROCKET WHEEL

[75] Inventor: Heinrich Schulte, Witten, Fed. Rep. of Germany

[73] Assignee: Klockner-Werke AG, Duisburg, Fed. Rep. of Germany

[21] Appl. No.: 100,526

[22] Filed: Dec. 5, 1979

[30] Foreign Application Priority Data

Dec. 23, 1978 [DE] Fed. Rep. of Germany ....... 2856099

[51] Int. Cl.$^3$ .............................................. F16H 7/06
[52] U.S. Cl. .................................... 474/155; 474/206
[58] Field of Search ............... 474/153, 155, 167, 175, 474/176, 206, 212, 164; 254/371, 372

[56] References Cited

U.S. PATENT DOCUMENTS

| 649,563 | 5/1900 | Willson | 474/153 |
|---|---|---|---|
| 2,477,783 | 8/1949 | Britt | 254/372 X |
| 2,662,415 | 12/1953 | Shields | 474/153 |
| 3,266,331 | 8/1966 | Burrows | 474/164 |
| 4,095,478 | 6/1978 | Rynik | 474/155 |

FOREIGN PATENT DOCUMENTS 1681958 4/1954 Fed. Rep. of Germany .
2735792 2/1979 Fed. Rep. of Germany .

OTHER PUBLICATIONS

Fordern and Heben, 23(1973) No. 4, entitled "Chain Pulleys for Trouble-free Motion", pp. 197 to 200.

Primary Examiner—Allan D. Herrmann
Attorney, Agent, or Firm—Watson, Cole, Grindle & Watson

[57] ABSTRACT

A drive sprocket wheel of the type having drive chain link receiving pockets formed between the sprocket teeth and a circumferential groove dividing each tooth into a pair of tooth sections with the outer tips at the flanks or sides thereof being cupped for the reception of the horizontal chain links, is improved by sloping the cupped outer tips toward the running direction of the chain. In the sloping direction, the outer portions of the flanks may be flat and are followed by concave surfaces. The sloping flanks of each pair of toothed sections establish theoretical points of contact with the rounded horizontal chain links during the drive operation, such points lying about midway between opposite sides of the sloping flanks.

5 Claims, 5 Drawing Figures

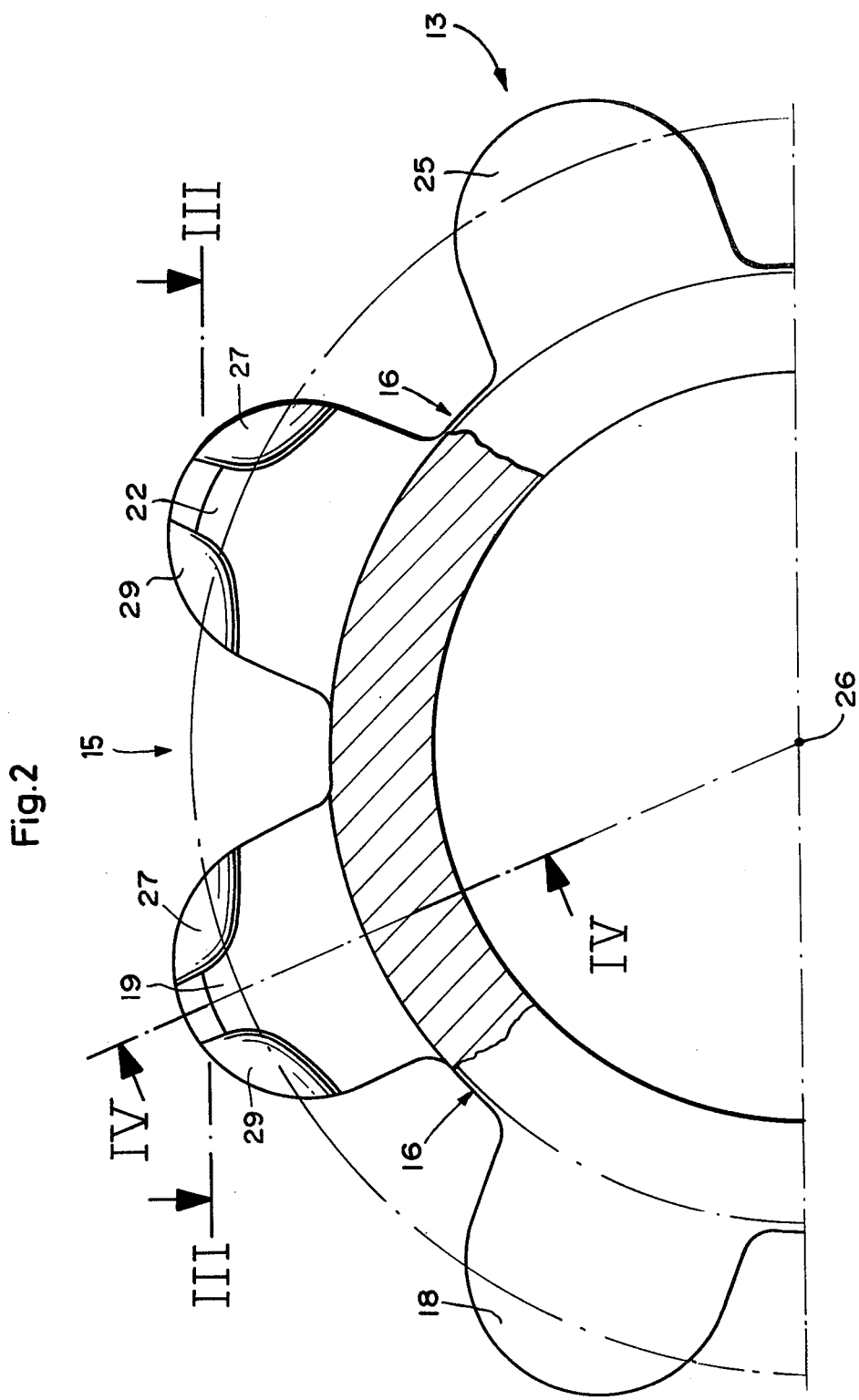

DRIVE SPROCKET WHEEL

BACKGROUND OF THE INVENTION

This invention relates generally to a sprocket wheel having sprocket teeth each in the form of divided tooth sections with pockets between the teeth for the reception of horizontal links of a drive chain engaging cupped outer tips at the flanks or sides of the sections, and more particularly to such a sprocket wheel wherein the cupped tips of each pair of tooth sections slope in the running direction of the chain.

Chain link drive sprockets, of the type which the invention pertains, are known to have double curved surfaces at the cupped outer tips at the flanks against which the horizontal chain links of the drive chain bear. The curvature of these surfaces is such that the chain links are cupped at the flanks of the teeth for driving the chain by the sprocket. Thus, the double curved surfaces provide contact surfaces for the chain links in such a manner that the chain links contact the surfaces throughout a wide area which thereby contributes to an unfavorable distribution of the forces needed to effectively drive the chain. Trouble-free operation between the chain links and the tooth flanks therefore becomes difficult to achieve with the aforedescribed prior art design. For example, the degree of effectiveness of the entire design is so unfavorable that, when measuring the results achieved, only 55 to 75% of the sprocket drive performance will reach the link chain. The unfavorable interplay between the chain and the tooth flanks may be due to the fact that the shape of the round steel chain links especially in the area of the arcs thereof, fluctuates and is so variable in the distribution because of the different factors of influence of the type of material used and the type of manufacture, that an optimum contact surface between the rounded portions of the horizontal chain links and the tooth flanks cannot be achieved. Thus, the horizontal chain links effect a particularly high concentrated pressure (Hertz' pressure) against the sprocket teeth so that the chain links are not snuggly received and cupped by the tooth sections. This leads to the development of premature and dangerous wear in the form of so-called "duck tails" which considerably decrease the fatigue strength of the chain and may thus cause downtime in the operation of the drive with accompanying increased expenses in labor and equipment.

Moreover, the unfavorable interplay between the chain and the sprocket wheel is due to the fact that the spacing tolerances of the sprocket wheel and of the chain generally are only responsible for the transfer of forces.

German Utility Patent No. 16 81 958 discloses another known drive sprocket wheel in which the cupped outer tips at the flanks of the tooth sections each have a radius of curvature designed to be equal to the radius of the chain links bearing thereagainst. In such an arrangement, an optimum contact surface between the rounded portions of the horizontal chain links and the curved tips are likewise incapable of being achieved so that the previously described particularly high pressures occur.

Other approaches taken in dealing with the problems described above include a shortening of the chain so that it may be stretched to the desired length during the driving operation. In so doing, however, deviations from the circular arc of the chain links develop whereupon undesirable so-called "pointed arches" develop.

The snug reception of the horizontal chain links by the sprocket teeth is not the only important design parameter for the drive sprocket. The location of the contact point between the chain links and the tooth flanks surfaces is likewise quite important.

And, it is not only important as to how the chain links contact the tooth flanks surfaces, but the location of such contact and the number of chain links which participate in the transfer of forces to the sprocket wheel are likewise important factors.

SUMMARY OF THE INVENTION

It is therefore an object of the present invention to achieve a defined support of the chain links independently of the tolerance deviations of the rounded portions of the contacting chain links and independently of the number of links in the chains so that the wear of the chain and the sprocket wheel is reduced to thereby increase the fatigue strength of the chain.

This objective is achieved according to the invention by sloping the cupped tips at tooth flank surfaces of the tooth sections, against which the horizontal links bear, toward the running direction of the chain thereby resulting in theoretical points of contact between the links and these surfaces at improved safe distances (e.g. midway) from opposite side edges of the cupped flanks. In the sloping direction, the upper portions of the tooth flank surfaces may be flat and may be followed by concave surfaces and the sloping flanks have an included angle of about 90°.

Another object is to provide such a sprocket wheel wherein the concave surfaces have curvature radii which are larger than the radius of the chain steel links. Such radii of curvature are larger by 20 to 80%, especially by 25 to 75%, than the radial thickness of the chain steel.

In such manner the fatigue strength of the chain will be increased. Moreover, since the theoretical points of contact between the horizontal chain links and the surfaces of the tooth flanks against which links bear are located about midway between at approximately the opposed edges of the flanks, the edges and corners of the tooth flanks project safe distances away from the tooth contact points to avoid any contact with the chain links to thereby avoid any diminished driving performance from the sprocket to the chain. The interior angle between the sloping surfaces of the tooth flanks assists in locating the points of contact at the safe distances mentioned above. The position of the horizontal chain links and the base of the pocket formed by the tooth flank surfaces is precise and is defined independently of the forces acting on the chain. And, the surfaces of the tooth flanks which slope in the running direction of the chain may be slightly curved rather than flat, i.e., may be convex, concave or combined convex and concave.

Optimally, four adjacent teeth are engaged by the chain links to effect an improved drive which results in a tolerance balance so that all the horizontal chain links bearing against the teeth effect the transfer to the drive chain. Moreover, the chain links are supported by these adjacent teeth at different levels thereon without affecting the power performance.

BRIEF DESCRIPTION OF THE DRAWINGS

FIG. 2 is a side elevational view of one half the drive sprocket wheel of the invention, shown partly in section, enlarged and taken along line II—II of FIG. 3;

DETAILED DESCRIPTION OF THE INVENTION

Figure 1:
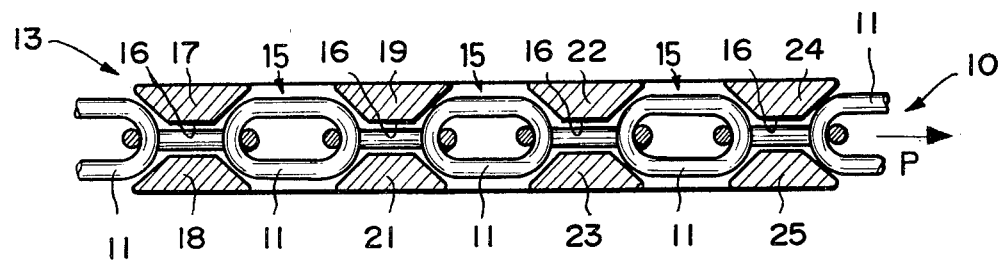
FIG. 1 is a sectional view taken through the drive sprocket wheel according to the invention and showing a drive chain supported thereby.
Figure 4:
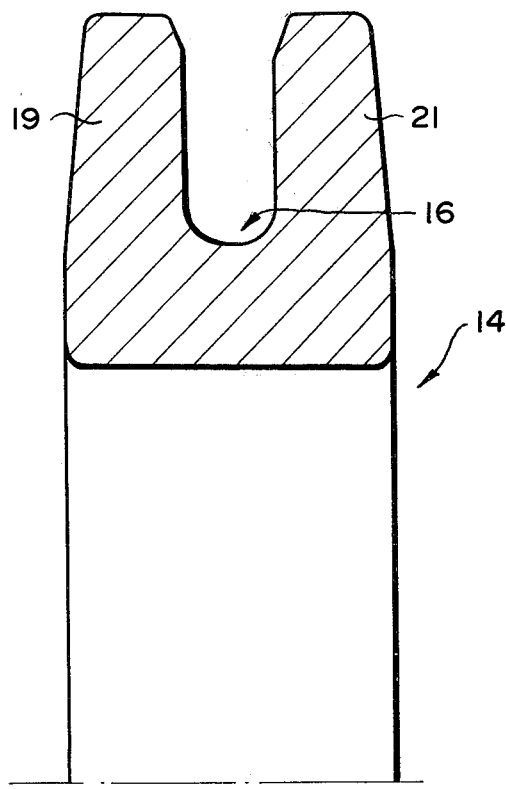
FIG. 4 is a sectional view of a typical sprocket tooth taken substantially along line IV—IV of FIG. 2.

Turning now to the drawings wherein like reference characters refer to like and corresponding parts throughout the several views, a drive chain is generally designated 10 in FIG. 1 and comprises a plurality of horizontal chain links 11 interconnected by a plurality of chain links 12 disposed substantially perpendicular thereto. A drive sprocket generally designated 13 has a plurality, for example, eight, of radially extending sprocket teeth 14 thereon of the type typically shown in FIG. 4. The sprocket teeth are spaced apart so as to form pockets 15 therebetween, and a circumferential groove 16 divides the teeth into tooth sections 17 and 18, 19 and 21, 22 and 23, 24 and 25. The drive sprocket is mounted for rotation about its central axis 26 (see FIG. 2) so that links 11 lie parallel to this axis and are received within pockets 15. Links 12 extend into groove 16 between the tooth sections. A drive of the sprocket clockwise in FIG. 2 moves the chain belt in the direction of arrow P of FIGS. 1 and 3 and, of course, driving the sprocket in the opposite direction moves the chain in the direction opposite that shown by arrows P. The drive sprocket and chain may be used for any number of drive operations too numerous to mention here. The four adjacent sprocket teeth shown in FIGS. 1 and 2 transmit the drive from the sprocket to the chain with the links thereof engaging these four adjacent teeth.

Figure 5:
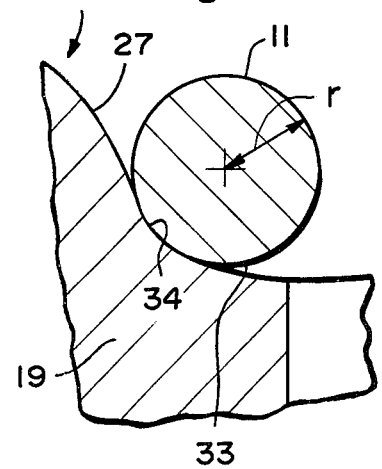
FIG. 5 is a sectional view showing the bearing relationship between a typical cupped tooth flank and a horizontal chain link, taken substantially along line V—V of FIG. 3.
Figure 3:
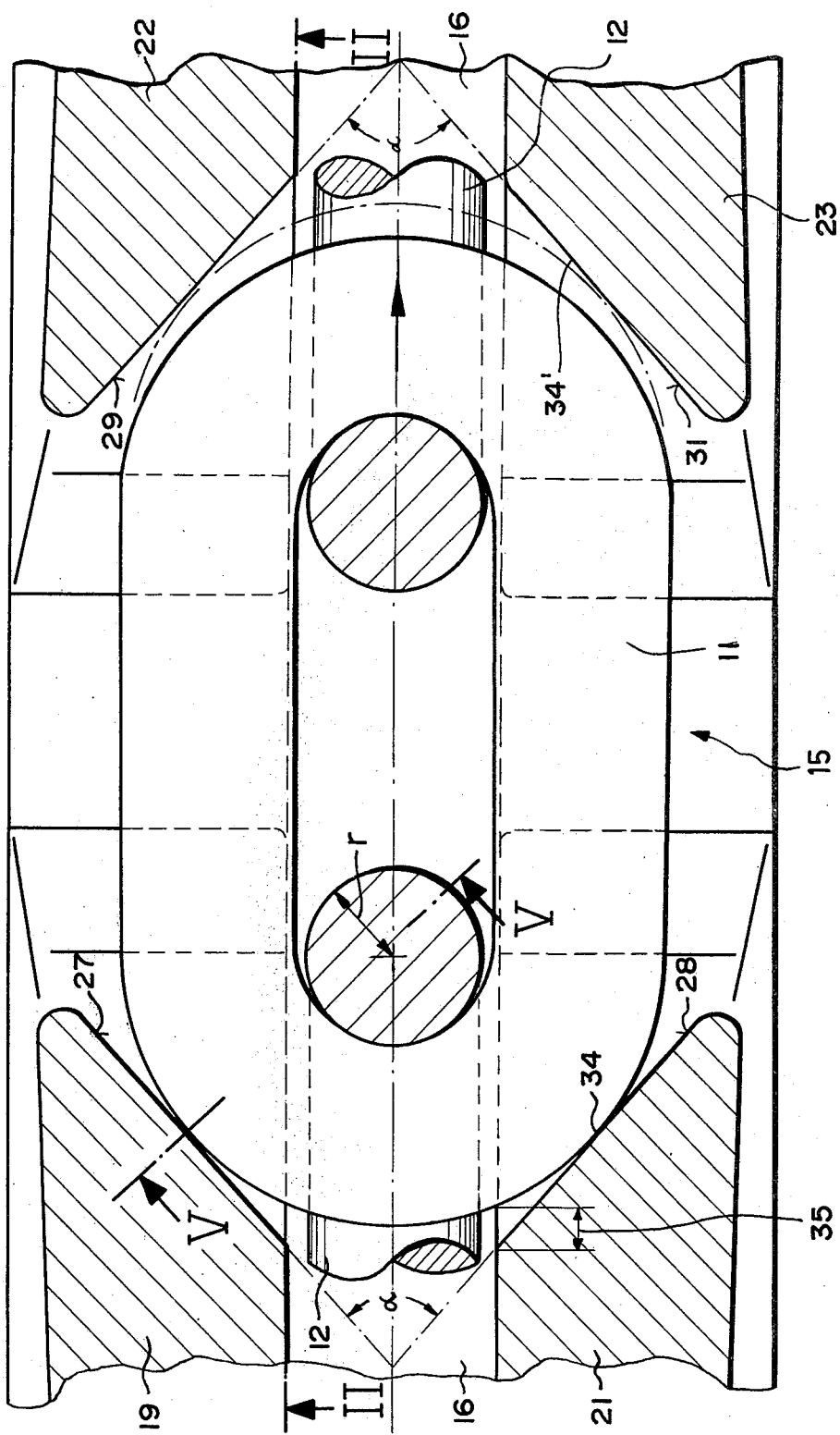
FIG. 3 is a view similar to FIG. 1, but greatly enlarged, of tooth flanks of an adjacent pair of sprocket teeth and with a horizontal chain link received therebetween, taken substantially along line III—III of FIG. 2.

Flanks or confronting sides 27, 28 and 29, 31 at the outer tips of adjacent pairs of tooth sections are shown in FIG. 3 as confronting one another for the reception of a horizontal chain link element 11. Tooth flank surfaces 27, 28, at the outer tips of tooth sections 19 and 21, slope away from a transverse direction and toward the running direction P of the chain. An included angle α between these sloping surfaces measures approximately 90°, and more particularly 84°, in FIG. 3. Similarly, flank surfaces 29 and 31 at the outer tips of tooth sections 22 and 23 slope away from a transverse direction toward the running direction of the chain when moving opposite the direction shown by arrow P. The included angle α between these surfaces is similar to that described for surfaces 27, 28. The upper areas 32 at which slanting surfaces 27, 28, 29, 31 lie may be convexly contoured in a direction perpendicular to the slope of these surfaces, as seen in FIG. 5. And, each such convexly contoured area is followed by concavely curved portions 33 having a radius of curvature considerably larger than the radial thickness of the chain links. More particularly, the radius of curvature of areas 33 is larger by 20 to 80%, especially by 25 to 75%, than the radial thickness r of the chain links.

Surfaces 27, 28, 29 and 31 are shown flat in FIG. 3 although they may be curved without departing from the invention so long as they slope toward the respective running direction of the chain as aforedescribed. These curved surfaces may be convex, concave or combined convex and concave shape.

In the running direction P of the chain, rounded portions of horizontal chain links 11 bear against the flank surfaces of tooth portions 19 and 21 at theoretical points 34 of contact at approximately the mid point between the outer ends and inner edges of concave surfaces 33 (FIGS. 3 and 5). With such an arrangement, such outer ends and inner edges of flank surfaces 27 and 28 are spaced sufficiently from points of contact 34 so as to avoid the likelihood contact between the horizontal chain links and these edges and corners which only causes performance problems. And, adjacent portions of links 11 are spaced adequate safe distances 35 from the edges of the grooves.

In a chain running direction opposite that shown by arrows P, chain link 11 shifts slightly into its phantom outline position shown in FIG. 3 and the bearing contact between it and surfaces 29 and 31 is the same as that described above with respect to surfaces 27 and 28. Thus, theoretical points 34' of contact are made between each horizontal chain link 11 and surfaces 29 and 31.

Obviously, many modifications and variations of the present invention are made possible in the light of the above teachings. It is therefore to be understood that within the scope of the appended claims, the invention may be practiced otherwise than as specifically described.

What is claimed is:

1. In a drive sprocket wheel of the type having drive chain link receiving pockets formed between sprocket teeth thereof and a circumferential groove dividing the teeth into a pair of tooth sections with the outer tips at the flanks or sides thereof being cupped for the reception of curved chain links of circular configuration, the wheel being rotatable about its central axis for moving the chain in first and opposite directions, the improvement wherein a first pair of said flanks of each of the teeth, against which the chain links exert pressure during movement of the chain in said first direction, slope toward said first direction for establishing points of contact between said chain links and said first pair of flanks so that said contact points lie approximately midway between opposed outer ends and inner edges of said first pair of flanks, and bottoms of said cupped outer tips are concavely curved in a direction perpendicular to the sloping direction of said flanks.

2. In the sprocket wheel according to claim 1, wherein a second pair of said flanks of each of the teeth, against which the chain links exert pressure during movement of the chain in said opposite direction, slope toward said opposite direction for establishing points of contact between said chain links and said second pair of flanks so that said contact points lie approximately midway between opposed outer end and inner edges of said second pair of flanks.

3. In the sprocket wheel according to claims 1 or 2, wherein said curved bottom have radii of curvature greater than the radial thickness of said links.

4. In the sprocket wheel according to claims 1 or 2, wherein said curved bottoms have radii of curvature greater by about 20 to 80% than the radial thickness of said links.

5. In the sprocket wheel according to claim 4, wherein said curved bottoms have radii of curvature greater by 25 to 75% than the radial thickness of said links.

* * * * *